United States Patent

[11] 3,628,507

| [72] | Inventor | Alfonso Saporiti<br>Genoa, Italy |
|---|---|---|
| [21] | Appl. No. | 882,618 |
| [22] | Filed | Dec. 5, 1969 |
| [45] | Patented | Dec. 21, 1971 |
| [73] | Assignee | Progettazioni Meccaniche Nucleari S.p.A.<br>Genoa, Italy |
| [32] | Priority | Dec. 14, 1968 |
| [33] | | Italy |
| [31] | | 7530 A/68 |

[54] LIQUID METAL HEATED STEAM GENERATORS AND SUPERHEATERS
10 Claims, 2 Drawing Figs.

[52] U.S. Cl. .................................................... 122/32, 165/134
[51] Int. Cl. ..................................................... F22b 1/06
[50] Field of Search .......................................... 122/32, 33; 165/70, 134, 157, 158, 163

[56] References Cited
UNITED STATES PATENTS
| 3,059,908 | 10/1962 | Fox et al. ................... | 165/70 X |
| 3,398,789 | 8/1968 | Wolowodiuk et al. ........ | 165/163 X |
| 3,187,807 | 6/1965 | Ammon ...................... | 122/32 X |

*Primary Examiner*—Kenneth W. Sprague
*Attorney*—McGlew and Toren

ABSTRACT: Saturated or superheated steam generators and superheaters fed with liquid metal, particularly with sodium as a heat transfer medium from a fast reactor or from an intermediate heat exchanger is a nuclear thermoelectric plant, have cylindrically shaped bodies with superposed annular chambers about their lower portions, and around their middle portions if deemed advisable. The annular chambers do not communicate directly with one another but each of them communicates with the interior of the cylindrical body, preferably through a circumferential slot which is horizontally arranged, i.e. normal to the axis of the cylindrical body. The slots are arranged at the base of each chamber just above the separation wall between two adjacent chambers, so teat each chamber acts as an independent multiple pneumatic bell suitable to counteract, as quickly and efficiently as possible, the development of overpressures due either to the reaction $2Na+H_2 = 2NaOH+H_2$ or to the direct action of steam or indirect action of hot water (flash effect).

INVENTOR.
ALFONSO SAPORITI
BY McGlew & Toren
ATTORNEYS

LIQUID METAL HEATED STEAM GENERATORS AND SUPERHEATERS

BACKGROUND OF INVENTION

The present invention consists of improvements in liquid sodium heated steam generators and/or superheaters for fast nuclear reactor plants in which the generator or superheater casing is provided with superimposed annular chambers forming multiple levels between the sodium and a covering gas.

In the past superheated steam generators and steam superheaters for thermoelectric plants with fast nuclear reactors using sodium as a thermal carrier, have been proposed, designed and realized in which pipe bundles having liquid sodium circulating outside the pipes, were arranged inside a casing with high pressure water and steam circulating through the pipes. Such generators may have various structural arrangements, however, they may be reduced to the following three main types, taking into consideration the proportions of the technical design which is related strictly to the most convenient solution for the structural arrangement in all its features:

a. Vertical straight pipes, with possible expansion curves, contained in a cylindrical casing closed by (upper and lower) ends heads, with the water and steam collectors secured thereto. The ratio between the useful length of the pipe bundle and the diameter of the casing is considerable, i.e. being 10 or more times.

b. Forklike pipes contained in a casing, generally with a straight section (the downward one) and another section shaped as a simple or multiple flat worm pipe; with (single or combined) heads both arranged at the upper end of the casing. The ratio of the useful length of the pipe bundle to the diameter of the casing is of about three times.

c. Pipe wound as multiple cylindrical helices, in a concentric arrangement with the number of turns of each pipe being different, and with heads as indicated for the above types. The ratio is smaller than for the above types, i.e., about 1.5 times.

In any case, the sodium completely submerges the useful portion of the pipe bundle; a chamber or space formed above the free level of the sodium contains a covering gas for absorbing, in case of any interaction between the water and sodium, the dynamic pressure wave, the development of reaction gases as well as the steam present and that generating by flashing of the high pressure water, and, further, for transmitting any resulting overpressure to a rupturable breakage diaphragms.

In the worst case, that is when the reaction phenomena caused by a pipe leaking or breaking occurs in the lower part of the exchanger, it is obvious that the above efficiency of the upper chamber with the covering gas will have a quantitative effect in inverse ratio to the length of the pipe bundle; that is, it will be at its maximum in type $c$ and at its minimum in type $a$ above. In other words, the local phenomena of damage to the other pipes, screens, grates, around the area of the leak or break, will increase and worsen depending on the depth of the liquid sodium and the number of mechanical obstacles (grates and the like) above the area of the sodium-warer reaction.

SUMMARY OF INVENTION

The object of the present invention is to position around both the lower and intermediate parts of the steam generator casing, superposed annular-shaped chambers, each communicating at its base with the interior of the casing, preferably through a circumferential slot located normal to the axis of the casing. Each chamber contains a separate supply of the covering gas at a pressure necessary for keeping the free level of the molten sodium just above the slot by means of an adjustment system which is described hereafter. Therefore, the outer cylindrical wall of the adjacent and continuous chambers forms the resistance casing for the steam generator, since the inner wall of the chambers is cut by the slots in planes normal to the axis of the generator. Each chamber is provided at its upper end with at least a rupturable diaphragm and/or a discharge valve which opens quickly and completely, the valve being servo-controlled through an impulse from a respective pressure gauge. Independently of these devices, each chamber containing the covering gas acts as an elastic means for absorbing overpressures as the result of any rise in the level of the sodium inside the chamber by a further compression of the covering gas.

From a physical point of view, in the present arrangement, as compared to the prior art, the utmost speed is attained in counteracting any overpressures developed. In fact, between the area where the sodium-water interactions take place, with the resultant exothermic reaction and increase in pressure, and the covering gas in the relevant chamber, there is only the intermediate liquid sodium which can not be removed and there are no movable mechanical members.

When designing the structure of the generator in order to reduce the liquid metal mass to be accelerated and expelled from around the pipe bundle, it is advisable to provide an annular chamber for each section of the pipe bundle between adjacent support grates; in fact, the grates obviously represent a considerable obstacle to the upward flow of gases and steam of reaction through the bores of the grate in the opposite direction to the normally downward flow of the circulating liquid sodium.

The breaking of the diaphragm and/or the opening of the valve of the chamber and the quick discharge of the compressed gas occur in a very short time interval, and is followed by the discharge of sodium after it has completely filled the entire volume of the chamber. The sodium discharge may continue until an adjustment in the circulation cycle takes place e.g. by shutting down the pumps circulating the liquid sodium or at least by intercepting the discharged sodium.

The free level of the sodium in each of the superimposed chambers may be easily adjusted by providing piping for the inlet of the covering gas at a pressure which is several times higher than the pressure of sodium in the lower part of the generator, and by independently feeding each chamber (from the upper part of the latter) through a calibrated throttle as a reduction valve, e.g. using a device with an adjustable labyrinth, that is with multiple throttles in series such as small foils with a small radial clearance against an axially displaceable cone, not shown in the drawings, (or by porous boards of sintered material having different thicknesses and cross sections), for obtaining nearly equal gas deliveries into the chambers at different heights and (resulting inner) pressures. In such a way, the covering gas penetrates continuously, with a small delivery, into each chamber at the respective pressure and slowly lowers the free level of the sodium down to the upper limit of the circumferential slot communicating with the interior of the casing containing the pipe bundle. Thereafter, any additional gas admitted to the annular chamber flows through the slot into the body of sodium about the pipe bundle and flows upwardly to the upper end of the generator which is provided with an adjustment for the free level of the sodium at that location and for replacing the covering gas.

As the passage about the pipe bundle is obstructed by the downward flow of sodium and by the pipe support grates, it is advisable to provide each chamber with an independent vertical pipe for venting the gas, with the pipe having its inlet at a preestablished minimum level of sodium and its outlet in the top of the upper chamber containing the covering gas. The outlet is located well above the free level of the sodium for avoiding any bypass escape of sodium circulating over the pipe bundle, which would be an obstacle to the upward flow of the gas. Under balanced conditions the sodium level in each vertical pipe will be lower than the free level of the sodium about the pipe bundle according to the proportion of resistance of the sodium circulation in the pipe bundle.

If during operation a decrease in the sodium pressure occurs, e.g. owing to a decrease in delivery or to discharge losses in the circuit, in each chamber a lowering of the free level of the sodium will take place due to the expansion of the covering gas, and thus an outflow of the covering gas as long as the balance between the respective pressures of the gas and the sodium at the corresponding positions in height is achieved. In case a contrary phenomenon occurs, with an increase in the local pressures of the main sodium flow, in each chamber the free level of the sodium will rise resulting in the compression of the covering gas as long as the balance is achieved by the pressure variation; then the continuous flow arrival of covering gas through the feeding throttle of each chamber again slowly brings the free level to the preestablished level of the inlet to the corresponding gas vent pipe.

The relatively small quantity of the covering gas overflowing continuously from the chambers and collecting in the upper head cooperates in the circulation of the covering gas contained therein toward devices for the purification and inspection of the possible presence of hydrogen.

BRIEF DESCRIPTION OF THE DRAWING

The accompanying drawing shows, by way of example only, a preferred embodiment of the invention according to the above-described objects and in which a liquid heat transfer medium not subject to phase changes is used, particularly sodium.

Figure 1:
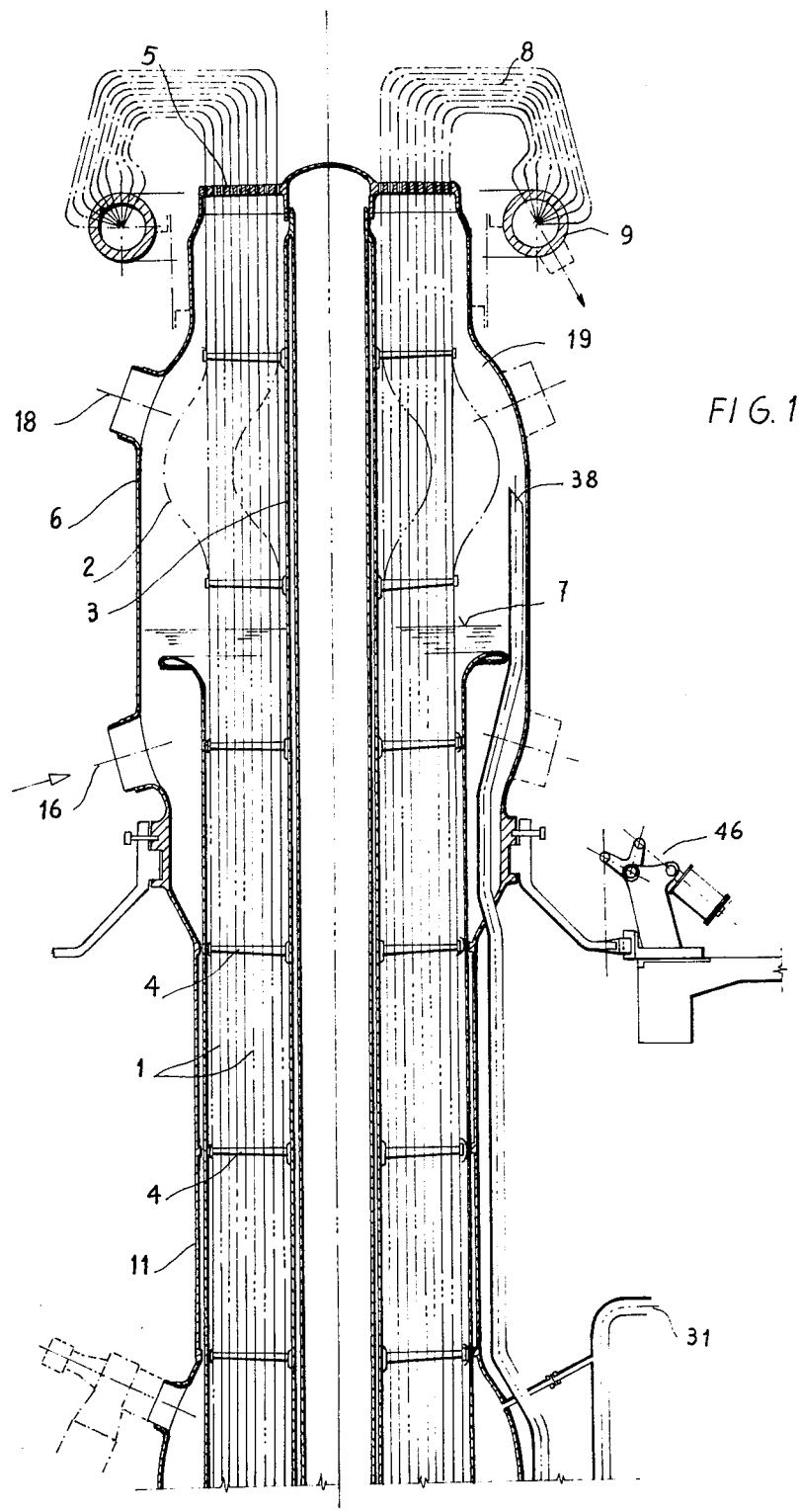
FIG. 1 shows a vertical section through the upper and middle portions of a steam generator.

The two figures are to be considered as one continuous section in order to show the ratio of the lengths of the active parts of the generator from the theoretical and structural points of view of the present disclosure, independently of the failure of proportion and scale in the drawing. It is to be noted that the section is subject to angular changes so as to show on the same figure plane circumferentially spaced parts, and that the views and sections normal to the axis are omitted as the angular position of such details is not an element of the invention.

DESCRIPTION OF THE PREFERRED EMBODIMENT

Figure 2:
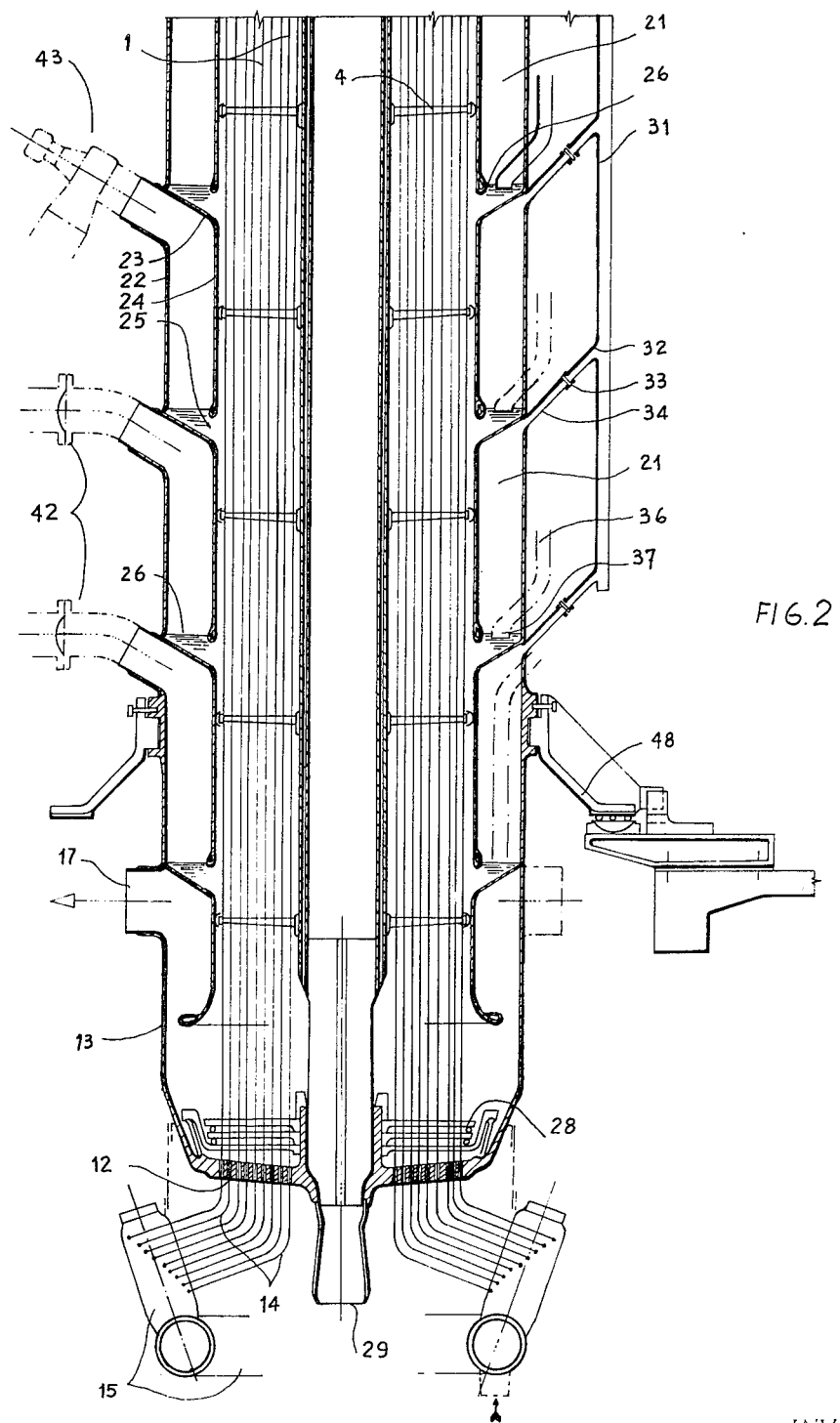
FIG. 2 shows a vertical section for the remaining middle and lower portions of the steam generator illustrated in FIG. 1.

In FIGS. 1 and 2 the steam generator is shown comprising a pipe bundle 1 supported by means of vertically spaced grates 4 within a vertically extending casing 11 which is closed at its opposite ends by an upper and a lower head 6, 13, respectively. Pipe plates or sheets 5, 12 are located within the upper and lower heads 6, 13, respectively, for securing the pipes at their points of entry into and exit from the casing.

Feed water is supplied to the lower ends of the pipes in the bundle 1 through a collector 15 and a plurality of pipe sections 14 extending between the collector and the pipe plate 12. The steam is discharged from the upper end of the bundle through pipe sections 8 into a collector 9. Liquid sodium is supplied to the casing 11 at its upper end through inlets 16 and after flowing downwardly in counterflow relationship with the liquid flowing through the pipe bundle 1, the liquid sodium is discharged through outlets 17 located in the lower end of the casing.

To compensate for any expansion in the pipe bundle expansion sections 2, note the phantom lines in FIG. 1, are located in the upper end of the casing. The pipe bundle 1 has an annular configuration being distributed about a centrally arranged vertically extending tubular member 3 which extends for approximately the height of the casing. Axially aligned below the tubular member 3 is another sodium outlet 29 which is located in the bottom of the lower head and is normally closed. The outlet 29 is used only in emergencies or in emptying the liquid sodium from the casing.

In the upper part of the casing the sodium has a free surface defined by the level 7 which is variable depending on the pressure of a covering gas contained in a chamber 19 formed within the upper head 6 of the casing with the lower end of the chamber being defined by the free surface of the sodium. A rupturable main diaphragm 18, the structure of the diaphragm is now shown in the drawing, is located in the upper head of the casing communicating with the chamber 19. In addition to the description of the casing and pipe bundle set forth above, detailed features of the steam generator construction which are not directly concerned with the invention are not described but are set forth in patents of the inventor directed to similar liquid metal heated steam generators.

Disposed about the lower and middle parts of the steam generator, note FIG. 2, are a plurality of superposed annular chambers 21. The exterior of the chambers 21 are formed of a cylindrically shaped continuous outer casing section 22. The interior of each chamber 21 is formed by a cylindrically shaped innner jacket 24 spaced radially inwardly form the casing 22. An annular-shaped wall member disposed transversely of the central axis of the casing extends radially outwardly from the upper end of each inner jacket 24 to the outer casing section 22 forming a top closure for each of the chambers 21. The lower edge of each inner jacket is spaced vertically above the subjacent inner jacket and annular member and forms a circumferentially extending slot disposed in a plane normal to the axis of the steam generator. The slots provide an opening communicating between the body of the liquid sodium in the interior of the steam generator and the individual chambers 21.

At the upper end of each of the chambers 21, a branch conduit extends outwardly and contains a rupturable diaphragm 42 and/or a servo-controlled discharge valve 43. The valve 43 is controlled through a relay and a pressure gauge, not shown, which is located within the chamber.

In operation, liquid sodium enters each of the chambers 21 but only to the level 26 of its free surface. Above the level 26 the chamber is filled with a covering gas. The covering gas is fed through a piping system 31 and passes through ports 32 into branch conduits 34 for delivery into the chambers. Each branch conduit contains a throttle 33 for regulating the quantity and pressure of gas supplied into the chamber. The level 26 of the sodium in each chamber is located in the plane of the inlet 37 into the pipe 36 which conducts the covering gas escaping from the chamber from the outlet 38 of the pipe into the chamber 19 in the upper head of the steam generator above the level 7 of the sodium.

The steam generator is supported in the vertical position by a system of upper supports 46 with constant charge springs, and by a system of lower supports 48 with roller carriages; both the upper and lower supports are keyed into the outer surface of the generator casing in radial sliding planes to assure the centering of the generator under any thermal conditions by affording expansion thrusts of the relevant piping.

It will be noted that each chamber 21 corresponds approximately to the spacing between adjacent pipe support grates 4. In the event there is a local failure in one of the pipes between the supports the reaction between the sodium and the water or steam in the pipe will be absorbed in the chamber 21 adjacent the break through the interconnecting slot at the lower end of the chamber.

What is claimed is:

1. A casing construction for steam generators and superheaters heated by a liquid metal, such as sodium, is comprised of an upwardly extending casing, a plurality of pipes disposed within and extending upwardly through said casing, means for supporting said tubes within said casing, inlet means for supplying liquid metal into said casing for maintaining a level of liquid metal in the upper portion of said casing, wherein the improvement comprises wall means providing a portion of the lower part of said casing below the level of the liquid metal in said casing and forming a plurality of separate superposed annular-shaped chambers extending circumferentially about said pipes, and said chambers communicating at the lower ends thereof with the body of liquid metal in said casing.

2. A casing construction, as set forth in claim 1, wherein said wall means comprising an upwardly extending tubular-shaped outer wall, an upwardly extending tubular shaped inner wall spaced radially inwardly from said outer wall, a plurality of annular wall members extending transversely of and spaced apart in the upward direction of the outer and inner walls, said annular wall members connected to and extending between said outer and inner walls and each forming a closure for the upper end of one of said chambers, and said inner wall having a circumferentially extending slot therein for each said chamber with said slot being located adjacent the lower end of said chamber with which it is associated.

3. A casing construction, as set forth in claim 2, wherein said inner wall comprising a plurality of upwardly aligned separate wall sections each connected at its upper edge to one of said annular wall members and being spaced at its lower edge upwardly from the subjacent said wall section and annular wall member.

4. A casing construction, as set forth in claim 1, wherein means are arranged for supplying a covering gas into each of said chambers, said means comprising a gas supply pipe, a plurality of branch pipes connected at one end to said supply pipe and at the other end extending into the upper part of said chambers for supplying gas thereto, and throttle means displaced within said branch pipes.

5. A casing construction, as set forth in claim 1, wherein pressure release means communicating with each of said chambers.

6. A casing construction, as set forth in claim 5, wherein said pressure release means comprises a branch conduit member connected to the upper portion of said chamber, and a rupturable diaphragm located within said branch conduit for relieving any products of the reaction of the liquid metal and the vaporizable liquid which collect in said chamber.

7. A casing construction, as set forth in claim 5, wherein said pressure release means comprises a chamber conduit member connected to the upper end of said chamber, a discharge valve within said branch conduit, and pressure sensitive means connected to said discharge valves and in communication with the interior of said chamber for opening said valve and releasing the products developed in the reaction between the liquid metal and vaporizable liquid which collect within said chamber.

8. A casing construction, as set forth in claim 1, wherein means are arranged for discharging excess gas from each said chamber, said means comprising an upwardly extending pipe, a branch section of said pipe extending into each said chamber and having a lower end located within and closely above said slot in said chamber, the upper end of said pipe being located within said casing above the level of the liquid metal therein.

9. A casing construction, as set forth in claim 1, wherein said pipe support means comprising a plurality of support grates spaced apart in the upper direction of said casing and each said chamber having a dimension in the upward direction approximately equal to the spacing between a pair of adjacent said support grates with the slot in each said chamber positioned between a pair of said support grates.

10. A casing construction, as set forth in claim 1, wherein means are arranged for discharging liquid metal from said casing after its passage over said pipes, said means comprises an outlet conduit connected to said casing and located below the lowermost said chamber.

* * * * *